No. 893,386. PATENTED JULY 14, 1908.
R. T. SCHULZ & J. SIHLER.
DASH POT FOR SCALES.
APPLICATION FILED JAN. 28, 1907.
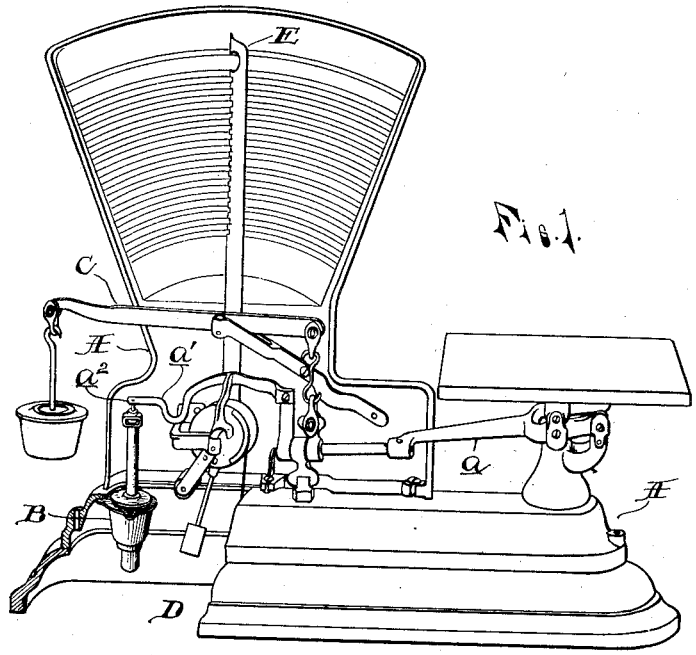
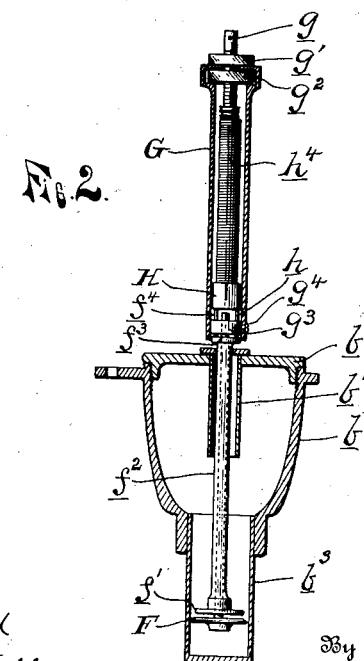
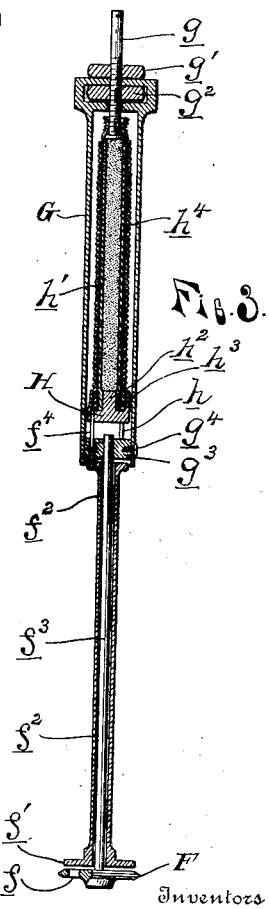
Witnesses
F. B. Howard
Henry E. Villerot
Inventors
Richard T. Schulz
John Sihler
By Charles H. Fisk
Attorney

UNITED STATES PATENT OFFICE.

RICHARD TH. SCHULZ AND JOHN SIHLER, OF DETROIT, MICHIGAN.

DASH-POT FOR SCALES.

No. 893,386.  Specification of Letters Patent.  Patented July 14, 1908.

Application filed January 28, 1907. Serial No. 354,559.

*To all whom it may concern:*

Be it known that we, RICHARD TH. SCHULZ and JOHN SIHLER, citizens of the United States, residing at Detroit, county of Wayne, State of Michigan, have invented a certain new and useful Improvement in Dash-Pots for Scales, and declare the following to be a full, clear, and exact description of the same, such as will enable others skilled in the art to which it pertains to make and use the same, reference being had to the accompanying drawings, which form a part of this specification.

Our invention relates to an improvement in dash pots for checking the vibration of scales, and is shown in the accompanying drawings, in which, Figure 1 is an elevation partly in section of a scale showing the dash pot in position, Fig. 2 is a vertical section of the pump showing parts in elevation; and, Fig. 3 is a vertical sectional view of the piston, piston-stem, and connections.

Our invention relates to that class of devices in which a piston moved in a liquid, commonly oil or glycerin, is employed for checking the vibration of the parts of a scale, and its object is to provide automatic means for opening or closing the passage-ways through or around the piston as the oil becomes more or less liquid due to the change in temperature.

In the drawings, A represents the frame of a scale and $a$ the beam-lever of the scale to which is attached an extension $a'$.

B represents the pump or dash pot, and the stem of the pump is connected at $a^2$ with the extension of the beam-lever $a'$.

C is a tare-beam having a connection with the main beam lever.

D is a pendulum, and E the pointer common with this class of pendulum scales.

The dash pot consists of the case $b$ of the usual form provided with a cap $b'$ that screws into the case and with the stem case $b^2$ that extends a sufficient distance down into the case $b$ to provide a receptacle for the oil around the stem-case when the scale is inverted in shipping.

$b^3$ is the pump cylinder that extends downward from the case and in which the piston operates, the piston working in oil in this cylinder.

In construction, the piston F fits the cylinder only close enough so that slight resistance is offered to the movement of the piston up and down in the cylinder. In order to decrease this resistance, holes $f$ are drilled through the piston, so that when the oil or other liquid used becomes thickened, means may be provided to allow it to pass through these openings to decrease the resistance to the piston. $f'$ is an additional piston or cap arranged on a stem $f^2$ to move to and from the main piston and to close the openings through the main piston, when it is desired to prevent oil from moving through them.

The special mechanism by which this dash pot is made automatic consists of means for closing or separating these two pistons, and consists of a case G connected to the upper end of the stem $g$ by means of two nuts, one $g'$ above the case, and one $g^2$ operating in an opening in the case, the two forming a set-nut to fix the position of the case on the stem $g$. In the lower end of the case G is a fixed block $g^3$ attached to the case by the screw $g^4$ and to the piston-stem $f^3$, the construction being such that the main piston F moves at all times with the case G and moves up and down with the beam-lever of the scale.

$f^4$ is a small pin that extends upward from the head of the sleeved stem $f^2$ and is set at the upper end in a block H, so that this block, the stem $f^2$, and the piston or cap $f'$ move together. $h$ is a second pin set in the block $g^3$ and is merely a guide to help keep the block H in position.

$h'$ is a rubber tube engaged at the lower end with the block H by being slipped over the pin $h^2$ and held to the pin by turning down the rim $h^3$ of the block H. The upper end of this tube is fixed to the lower end of the short stem $g$. This rubber tube is filled with mercury and its position adjusted relative to the stem of the main piston and the case G by the adjusting nuts $g'$ and $g^2$, the adjustment being such that in a moderate or normal temperature the expansion of the mercury will hold the additional piston or cap $f'$ a slight distance away from the main piston, but so that in cold weather when the mercury contracts, the block H will be drawn up and the cap $f'$ so far separated from the main piston as to allow the thickened liquid to pass more freely through the main piston. In warm weather the mercury will expand sufficiently to close the cap $f'$ against the main piston and shut off the flow of the liquid through the piston entirely.

$h^4$ is a spiral spring placed around the rubber tube to protect it and serves to draw the block H up against the mercury, while at the same time, allowing the mercury to expand and to move the block H downward.

What we claim is:—

1. In a dash pot, the combination with a cylinder and a piston, the latter having an opening of thermostatic means for opening and closing said opening.

2. In a dash pot, a cylinder, a piston, there being an opening from one end of the cylinder to the other, and thermostatic means for increasing and decreasing the opening from one end of the cylinder to the other, substantially as described.

3. In a dash pot, the combination with a cylinder and a piston, of thermostatically operating means constructed and arranged for coöperation with the piston to retain the liquid of the dash pot upon one side of the piston or to displace a portion of the liquid from one side of the piston to the opposite side thereof.

4. In a dash pot for scales, the combination of a cylinder a piston provided with openings, a cap and thermostatic means for actuating said cap to open and close said openings.

5. In a dash pot for scales, a cylinder a piston provided with openings, a piston-stem, a cap for closing the openings in the piston, a stem for the cap sleeved on the piston-stem, and thermostatic means for moving the sleeved stem to open and close the piston, substantially as described.

6. In a dash pot for scales, a cylinder a piston having openings for circulating the liquid from one side of the piston to the other, means for opening and closing said openings, and thermostatic means for operating the opening and closing means comprising a rubber tube containing mercury, substantially as described.

7. In a dash pot including a cylinder and a piston, means constructed and arranged for regulating the flow of liquid from one side of the piston to the other, and thermostatic means for operating the regulating means.

8. A dash pot including a case and a communicating piston chamber, said case having a removable closure provided with a central opening and a depending piston rod case coinciding with said opening, a main piston rod extending through said opening and piston rod case said rod being provided with a piston for reciprocation in said chamber, the piston having an opening therein, a cap embracing the piston and provided with a stem, a casing having connection with the stem of said cap, a mercury tube confined within the last mentioned casing to confine mercury and operating to automatically raise and lower said cap toward and away from the piston to open and close the opening of the piston, and a shielding means surrounding the mercury tube.

9. A dash pot including a case and a communicating piston chamber, said case having a removable closure provided with a central opening and a depending piston rod case coinciding with said opening, a main piston rod extending through said opening and piston rod case said rod being provided with a piston for reciprocation in said chamber, the piston having an opening therein, a cap embracing the piston and provided with a stem, a casing having connection with the stem of said cap, a mercury tube confined within the last mentioned casing to confine mercury therein to automatically raise and lower said cap toward and away from the piston to open and close the opening of the piston.

10. In a dash pot, a cylinder a piston provided with an opening to permit of circulation of the liquid from one side of the piston to the other, means for opening and closing said opening, and thermostatic means for operating the opening and closing means including a tubular mercury containing member.

In testimony whereof, we sign this specification in the presence of two witnesses.

RICHARD TH. SCHULZ.
JOHN SIHLER.

Witnesses:
HENRY E. VILLEROT,
S. E. THOMAS.